United States Patent
Vergara

(10) Patent No.: US 10,352,366 B2
(45) Date of Patent: Jul. 16, 2019

(54) DRIVE CONNECTION FOR A CHOPPING DRUM AND HARVESTING MACHINE

(71) Applicant: Deere & Company, Moline, IL (US)

(72) Inventor: Daniel Vergara, Torrejon de Ardoz (ES)

(73) Assignee: DEERE & COMPANY, Moline, IL (US)

( * ) Notice: Subject to any disclaimer, the term of this patent is extended or adjusted under 35 U.S.C. 154(b) by 822 days.

(21) Appl. No.: 15/007,657

(22) Filed: Jan. 27, 2016

(65) Prior Publication Data

US 2016/0223025 A1    Aug. 4, 2016

(30) Foreign Application Priority Data

Feb. 2, 2015    (DE) .......................... 10 2015 201 749

(51) Int. Cl.
*F16D 1/06*    (2006.01)
*A01F 29/14*    (2006.01)
(Continued)

(52) U.S. Cl.
CPC ............... *F16D 1/06* (2013.01); *A01D 69/08* (2013.01); *A01F 29/14* (2013.01); *F16D 13/52* (2013.01); *A01D 2101/00* (2013.01)

(58) Field of Classification Search
CPC . F16D 1/06; F16D 13/52; A01D 69/08; A01F 29/14; B60K 17/02
See application file for complete search history.

(56) References Cited

U.S. PATENT DOCUMENTS

| 1,937,233 A | * | 11/1933 | Lansing | .................. | F16D 41/22 |
| | | | | | 192/41 R |
| 5,038,904 A | | 8/1991 | Miller | | |

(Continued)

FOREIGN PATENT DOCUMENTS

| AU | 679897 B3 | 7/1997 |
| DE | 2020919 A1 | 4/1971 |

(Continued)

OTHER PUBLICATIONS

European Search Report in foreign counterpart application No. 16153433 dated Jul. 4, 2016 (5 pages).

(Continued)

*Primary Examiner* — Zakaria Elahmadi

(57) ABSTRACT

A drive connection couples a drive wheel to a drive shaft at the end of a chopping drum through a clutch arrangement including a clutch disk unit having clutch disks on the drive wheel side and clutch disks on the drive shaft side, the disks being frictionally engaged with each other by a pressure plate arranged on a drive shaft end region and acting on the clutch disk unit, and a connecting bolt arranged concentrically to the drive shaft. Formed on the connecting bolt is a first external thread located for being brought into engagement with a first threaded bore provided in the pressure plate, and a second external thread for being brought into engagement with a second threaded bore provided in the shaft end region, wherein the first and second external threads and the first and second threaded bores have thread directions configured to oppose one another.

11 Claims, 4 Drawing Sheets

(51) Int. Cl.
*A01D 69/08* (2006.01)
*F16D 13/52* (2006.01)
*A01D 101/00* (2006.01)

(56) References Cited

U.S. PATENT DOCUMENTS

| | | | | |
|---|---|---|---|---|
| 5,081,385 A | * | 1/1992 | Gajjar | F16D 7/025 192/56.1 |
| 5,181,594 A | * | 1/1993 | Nash | F16D 13/52 192/70.27 |
| 5,383,544 A | * | 1/1995 | Patel | F16D 13/52 192/111.15 |
| 5,524,739 A | * | 6/1996 | Baier | F16D 13/70 192/70.16 |
| 5,622,034 A | * | 4/1997 | Dommert | A01D 45/10 192/53.6 |
| 5,890,353 A | * | 4/1999 | Brown | A01D 45/10 241/236 |
| 6,047,803 A | * | 4/2000 | Pinschmidt | F16D 13/52 192/70.11 |
| 6,132,103 A | * | 10/2000 | Englund | F04C 29/005 384/127 |
| 6,736,023 B1 | * | 5/2004 | Sumi | F16D 1/06 403/359.1 |
| 7,026,770 B2 | * | 4/2006 | Hemphill | F16H 61/32 180/344 |
| 2008/0099298 A1 | * | 5/2008 | Yoshinaga | F16D 13/52 192/70.14 |
| 2012/0319019 A1 | * | 12/2012 | Burgess | F16K 31/088 251/129.11 |
| 2013/0210506 A1 | * | 8/2013 | Hollatz | A01D 69/08 460/112 |
| 2014/0102847 A1 | * | 4/2014 | Youngwerth | F16D 13/75 192/70.251 |
| 2015/0276020 A1 | * | 10/2015 | Yoon | F16H 3/005 475/12 |

FOREIGN PATENT DOCUMENTS

DE 2640620 A1 3/1977
DE 3540014 C1 * 12/1986 ................ F01P 5/04

OTHER PUBLICATIONS

German Search Report issued in corresponding application No. 102015201749.4, dated Oct. 12, 2015 (10 pages).

* cited by examiner

DRIVE CONNECTION FOR A CHOPPING DRUM AND HARVESTING MACHINE

RELATED APPLICATIONS

This application claims priority to DE application number 102015201749.4 filed Feb. 2, 2015.

TECHNICAL FIELD

The invention relates to a drive connection for a chopping drum as well as a harvesting machine comprising a chopping device having such a drive connection.

BACKGROUND

It is known to provide harvesting machines with a chopping device in which the harvested crops, preferably stalky harvested crops such as maize or sugar cane, after being cut or detached from the ground during the harvesting process, are chopped and/or shredded in a further operating step. Such chopping devices are used, for example, in forage harvesters or even in sugar cane harvesting machines. The chopping devices may be configured as single or twin chopping drum devices, wherein the first chopping drum device comprises a rotating drum which is provided with blades and which rotates against a fixed blade, wherein the edges of the blades are aligned axially with a rotational axis of the drum and the harvested crops to be chopped are guided between the chopping drum and the fixed blade and thereby shredded. The second chopping drum device, however, comprises two chopping drums rotating in opposing directions and provided with blades, wherein the harvested crops to be chopped are guided between the two chopping drums and thereby shredded. In this case, the edges of the blades are also respectively aligned axially with the rotational axes of the drums. The rotational speed and also the number of blades arranged on a chopping drum may be varied, depending on the desired degree of chopping. In particular, in a twin chopping drum device, a fine adjustment of the drums relative to one another has to be carried out in order to ensure that the blades run against one another in a precise manner and accurately spaced apart. However, this is often only possible after assembling the harvesting machine and, in particular, after installing the chopping device. In said chopping device, one of the chopping drums is generally arranged after the installation thereof and/or after mounting in the drive chain so as to be non-adjustable, wherein the second chopping drum is configured to be releasable from the drive train and its position and/or rotational position is configured to be correspondingly adjustable relative to the other chopping drum. Generally, this is implemented via a releasable flange connection, screw connection or bolt connection between a drive wheel in the drive train of the chopping device and the chopping drum to be adjusted. The adjustment to be carried out and/or the so-called "timing" takes place in this case when the gear unit and/or housing of the drive train of the chopping device are open, which involves a certain mounting cost and loss of time. It is also known to avoid opening the gear unit and/or the housing of the drive train, by a clutch arrangement being provided on one of the chopping drums in order to permit a non-positive connection and/or a release of the clutch device from outside the gear unit and/or the housing of the drive train. A drawback here is that the known solutions provide the required non-positive connection for the clutch arrangement by a plurality of connecting bolts and/or screws which are arranged in a specific radius relative to the rotational axis of the chopping drum and as a result are subjected to high alternating bending stresses. Additionally, the screws are provided with screw heads, the distance thereof from the screw shank additionally providing points of application for alternating stresses due to bending moments. This may often lead to the fracture of the screw and thus cause the malfunction of the chopping device.

Therefore, it is desireable to provide a drive connection which permits a simple and practicable adjustment or tuning and/or "timing" of the chopping device and by which the aforementioned problems are overcome.

SUMMARY

Such a drive device is proposed by the teaching of claims 1 and 11. Further advantageous embodiments and developments are disclosed in the subclaims.

At least one example embodiment of the subject matter of this disclosure is understood by referring to FIGS. 1 through 4 of the drawings.

According to a first aspect, a drive device for a chopping drum is proposed, comprising a drive wheel, a drive shaft and a clutch arrangement, wherein the clutch arrangement comprises a clutch disk unit which has clutch disks on the drive wheel side and clutch disks on the drive shaft side and which is able to be acted upon by an axial force and which is able to be brought into a frictional connection by a pressure plate arranged on a shaft end region of the drive shaft and acting on the clutch disk unit, and a connecting bolt arranged concentrically to the drive shaft, wherein the connecting bolt comprises a first external thread which is able to be brought into engagement with a first threaded bore configured in the pressure plate and comprises a second external thread which is able to be brought into engagement with a second threaded bore configured in the shaft end, wherein the first and second external threads and the first and second threaded bores have thread directions which are configured so as to oppose one another. By the aforementioned configuration of the clutch arrangement between the drive shaft and the drive wheel, it is possible to release and/or to clamp axially the clutch arrangement from outside the housing of the drive train and/or chopping device in order to loosen the clutch disk unit provided and/or to bring said clutch disk unit into a frictional connection. By the opposingly positioned threads on just one connecting bolt, with a rotational movement of the connecting bolt the pressure plate and the drive shaft are moved away from one another or toward one another (depending on the rotational direction) and thus the clutch disk unit is released and/or brought into a frictional connection, wherein the connecting bolt is accessible in a maintenance-friendly manner from outside (outside a housing enclosing the gear train). Thus with a minimal maintenance cost and a minimal number of different parts, an exceptionally simple and practicable solution is provided for producing the non-positive connection between the drive wheel and the drive shaft of the chopping drum. By the use of the connecting bolt proposed here and arranged concentrically to the drive shaft, due to the absence of a lever arm between the drive shaft and the connecting bolt, the non-positive connection is additionally implemented without noticeable bending stresses acting on the connecting bolt. As a result, the connecting bolt is prevented from fracturing.

According to a second aspect, the connecting bolt has a maximum diameter in the region of the first external thread so that the first external thread may be configured as a thread extending as far as an open end of the connecting bolt on the front face and, in particular, no flange, collar or other type of projection oriented radially outwardly is formed on the open end of the connecting bolt on the front face. As a result, bending moments acting on the connecting bolt are avoided, as when forming a flange, collar or other type of projection oriented radially outwardly, due to a contact surface and/or bearing surface being produced thereby relative to the pressure plate, said bending moments would be introduced into the connecting bolt, which in turn could lead to the fracture of the connecting bolt.

According to a third aspect, the pressure plate is configured such that the shaft end is covered. Moreover, a circular surface facing the clutch arrangement is configured on the pressure plate. The pressure plate is preferably brought with its circular surface into contact with the clutch arrangement and clamped thereto, whereby axial clamping is carried out on the clutch disk unit, and said clutch disk unit is able to be brought into a frictional connection. Conversely, the pressure plate may be moved with its circular surface away from the clutch arrangement and the frictional connection may be accordingly released.

According to a fourth aspect, the clutch arrangement comprises a clutch ring which is mounted in an axially displaceable manner on the shaft end region between the pressure plate and the clutch unit and which has a circular surface which is oriented toward the shaft end and which is able to be brought into engagement with the circular surface of the pressure plate facing the clutch arrangement. This has the advantage that the pressure plate does not directly come into contact with the clutch disk unit but presses on the clutch ring to protect against wear and presses and/or clamps said clutch ring axially onto the clutch disk unit for forming the frictional connection.

According to a fifth aspect, the first external thread and the first threaded bore have a thread pitch which is different from the second external thread and/or the second threaded bore, and a thread diameter which is different from the second external thread and/or the second threaded bore. The different thread pitch enables the extent to which the pressure plate and the drive shaft are able to be moved toward one another and/or moved away from one another to be influenced. The different thread diameters permit a functional and maintenance-friendly assembly.

According to a sixth aspect, it is preferred that the first external thread and the first threaded bore are provided with a larger thread pitch relative to the second external thread and/or the second threaded bore. Moreover, the first external thread and the first threaded bore have a larger thread diameter relative to the second external thread and/or the second threaded bore. The ratio of the thread pitch and the thread diameter shown here in the exemplary embodiment is adapted to the exemplary embodiment described below and has proved to be a possible arrangement in this connection. Other, different arrangements are, therefore, also possible.

According to a seventh aspect, a spacer sleeve is mounted on the shaft projection of the drive shaft, the clutch disk unit and the drive wheel being axially supported thereon, wherein the clutch disk unit is arranged between the spacer sleeve and the pressure plate. The spacer sleeve, therefore, represents a means for producing a counter-force which is required when axial force is applied by the connecting bolt and at the same time also provides a projection, the drive wheel axially coming to bear thereagainst and being axially secured thereby with clearance.

According to an eighth aspect, a threaded pin is arranged so as to be able to be brought into engagement with a through-bore configured in the pressure plate and with a threaded bore configured in the shaft end, in order to prevent the pressure plate from rotating relative to the drive shaft. The threaded pin in this case is guided through the through-bore and screwed into the threaded bore. Thus the pressure plate is secured against rotation relative to the drive shaft, and the connecting bolt which is in engagement with the pressure plate and the drive shaft, by the rotation of the pressure plate relative to the drive shaft, is thereby prevented from rotating therewith.

According to a ninth aspect, a connecting plate and a securing pin are provided, for example a spring cotter pin, wherein the connecting plate connects the tool attachment of the connecting bolt to the threaded pin, so that a rotation of the connecting bolt relative to the threaded pin is blocked and wherein the securing pin extends transversely to the threaded pin, through said threaded pin, and axially secures the connecting plate relative to the threaded pin. The securing pin preferably extends through a transverse bore in the threaded pin and fixes the connecting plate against axial displacement. Thus it is ensured that the connecting plate is not able to be axially released from the threaded pin and/or from the connecting bolt so that the securing against rotation, which is provided thereby, remains permanent even under operating conditions.

According to a tenth aspect, a drive connection for a chopping device according to the above aspects is suitable, in particular, for use in a harvesting machine, for example a forage harvester or a sugar cane harvester, wherein said forage harvester or sugar cane harvester is generally equipped with a chopping device having two chopping drums and one of the drums for adjusting the chopping rate and the chopping output is able to be released from the drive train and adjusted relative to the other drum. Forage harvesters are generally provided with a chopping device with only one rotating chopping drum, which however may also have a drive connection according to the above embodiment. Other harvesting machines in which a chopping device is provided may also be equipped with such a drive connection and are thus considered here.

With reference to the drawings which disclose an exemplary embodiment of the invention, the invention and further advantages and advantageous developments and embodiments of the invention are described and explained hereinafter in more detail.

BRIEF DESCRIPTION OF THE DRAWINGS

The brief description of the drawings refers to the accompanying figures in which.

DETAILED DESCRIPTION OF THE DRAWINGS

Figure 1:
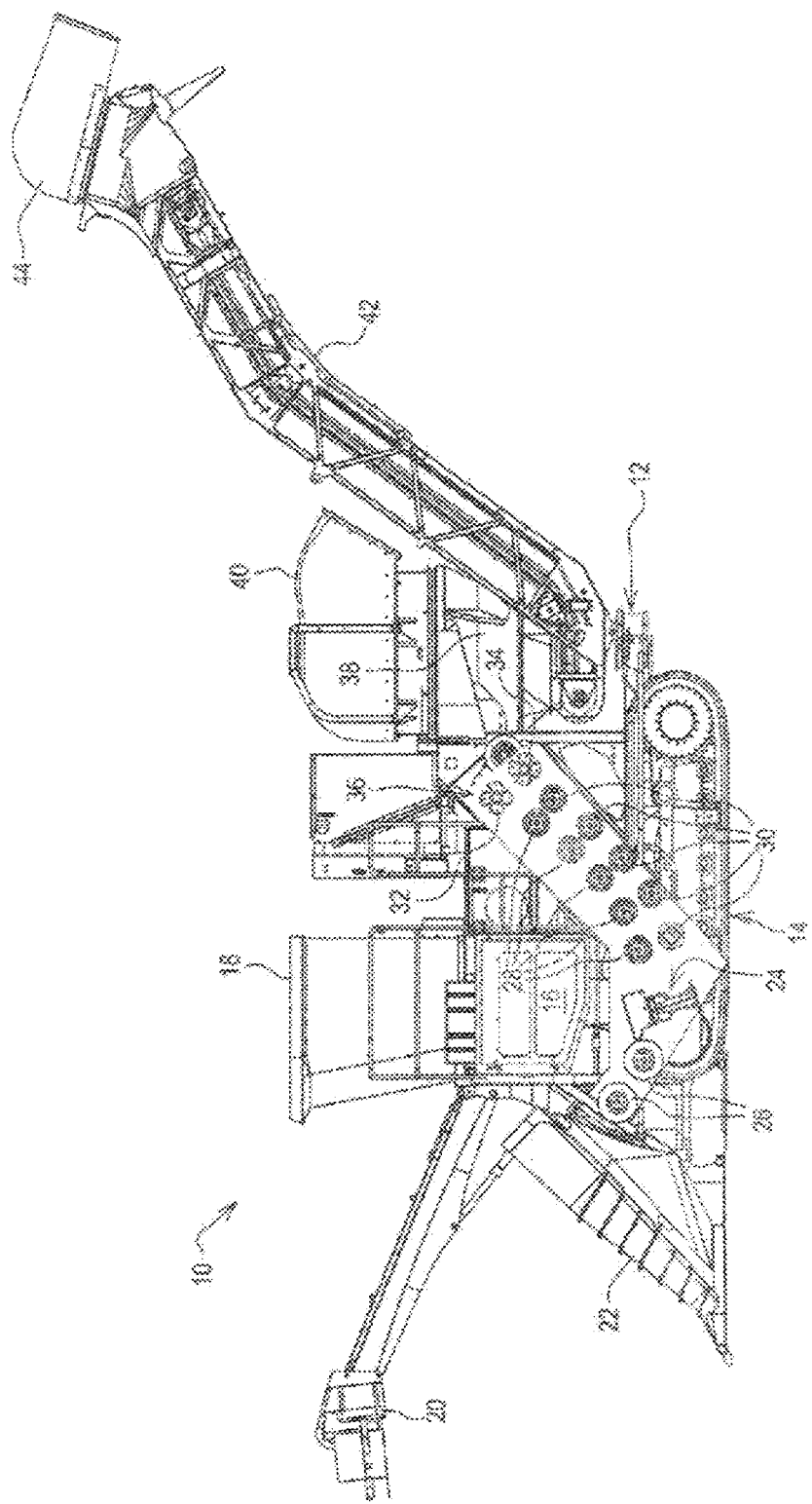
FIG. 1 shows a schematic side view of a harvesting machine in the form of a sugar cane harvester comprising a chopping device.

FIG. 1 shows a harvesting machine 10 in the form of a sugar cane harvester for harvesting sugar cane cultivated in rows. The harvesting machine 10 comprises a frame 12 with right-hand (not shown) and left-hand chain drive tracks 14. An internal combustion engine 16 ensures the drive of the chain drive tracks and supplies drive energy to other units arranged and driven on the harvesting machine 10. A vehicle cab 18 is arranged at the front part of the frame 12. Moreover, the harvesting machine 10 comprises an upper cutting device 20, the sugar cane being supported thereby at the upper end during the harvesting process in order to reduce the leaf part on the harvested crops in the first instance. In order to ensure harvesting which is controlled in rows, plant spacers 22 are provided. A ground cutting unit 24 which serves for cutting the sugar cane above the ground is also provided below the motor 16 and between the chain drive tracks 14. Hold-down rollers 26 which press down the sugar cane stalks in the forward direction before being cut by the ground cutting unit 24 are arranged above the ground cutting unit 24. A plurality of pairs of feed rollers 28, 30 are arranged in rows extending to the rear and in the upward direction and are adjoined to the ground cutting unit 24 and convey the cut sugar cane into a chopping device 36 configured with upper and lower chopping drums 32, 34. The chopping device 36 chops up the sugar cane stalks which are then guided into a cleaning chamber 38 with a separating device 40. Here the chopped crop is cleaned of leaves which have been harvested therewith and other impurities by a fan (not shown) provided in the separating device 40. From here the chopped crops drop onto a conveyor belt 42 and are conveyed into a second separator 44 for further cleaning, before they are unloaded from the rear end of the conveyor belt 44 into a forage box (not shown) following the harvesting machine 10. The chopping drums 32 and 34 of the chopping device 36 are driven via a common drive device (not shown). The chopping drums 32, 34 are not shown in further detail here and in a conventional manner are provided with chopping blades known from the prior art, the cutting edges thereof being aligned axially with the rotational axes of the chopping drums 32, 34. One of the chopping drums 32, 34 is equipped with a drive connection 46 according to the views in FIGS. 2 to 4.

The drive connection 46 comprises a drive wheel 48, a drive shaft 50 and a clutch arrangement 52, wherein the clutch arrangement 52 contains a clutch disk unit 54 having clutch disks 56, 58 respectively on the drive wheel side and the drive shaft side, as well as a clutch ring 62 axially displaceably mounted on a shaft end region 60 of the drive shaft 50. The clutch ring 62 is axially displaceably mounted on the drive shaft 50 between a pressure plate 64 and the clutch disk unit 54 and has a circular surface 66 oriented toward the shaft end region 60, which is able to be brought into engagement with a circular surface 68 of the pressure plate 64 facing the clutch arrangement 52. Moreover, the clutch ring 62 has a circular surface 70 oriented toward the clutch disk unit 54, the clutch ring 62 being able to be brought into engagement with the clutch disk unit 54 thereby in an axially displaceable manner. A fastening flange 71 adjoins the drive shaft 50, for connecting to the chopping drums 32, 34. A connecting bolt 72 arranged concentrically to the drive shaft connects the pressure plate 64 to the drive shaft 50. The connecting bolt 72 has a first external thread 74 and a second external thread 76. The first external thread 74 is in engagement with a first threaded bore 78 configured in the pressure plate 64 and the second external thread 76 is in engagement with a second threaded bore 80 configured in the shaft end region 60, wherein the first and second external threads 74, 76 as well as the first and second threaded bores 78, 80 have thread directions which are configured so as to oppose one another. An axial force is introduced via the connecting bolt 72 between the drive shaft 50 and the pressure plate 64, the axial force in turn being transmitted from the pressure plate 64 to the clutch ring 62 and thus acting on the clutch disk unit 54 and bringing the clutch disk unit into a frictional connection.

By the above-described configuration of the clutch arrangement 52 between the drive shaft 50 and the drive wheel 48, it is possible to release and/or to clamp axially the clutch arrangement 52 from outside a housing of the drive connection 46 and/or the chopping device 36 in order to loosen the clutch disk unit 54 provided and/or to bring said clutch disk unit into a frictional connection. By the opposing external threads 74, 76 on only one connecting bolt 72, with a rotational movement of the connecting bolt 72, the pressure plate 64 and the drive shaft 50 are moved away from one another or toward one another and, depending on the rotational direction, the clutch disk unit 54 is released and/or brought into a frictional connection thereby. Thus with minimal maintenance cost and a minimal number of different parts an exceptionally simple and practicable solution is provided for producing the non-positive connection between the drive wheel 48 and the drive shaft 50 of the chopping drum 32, 34.

Figure 3:
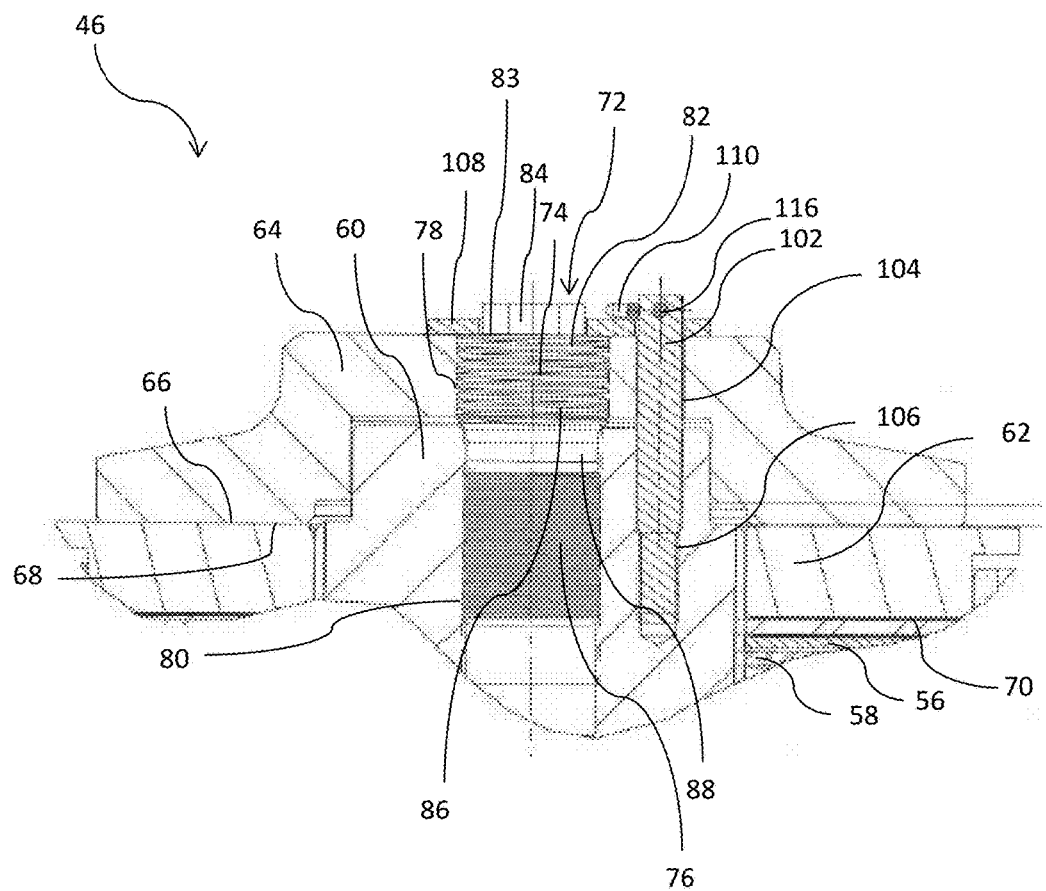
FIG. 3 shows an enlarged view of a part of the schematic cross-sectional view of FIG. 2.
Figure 4:
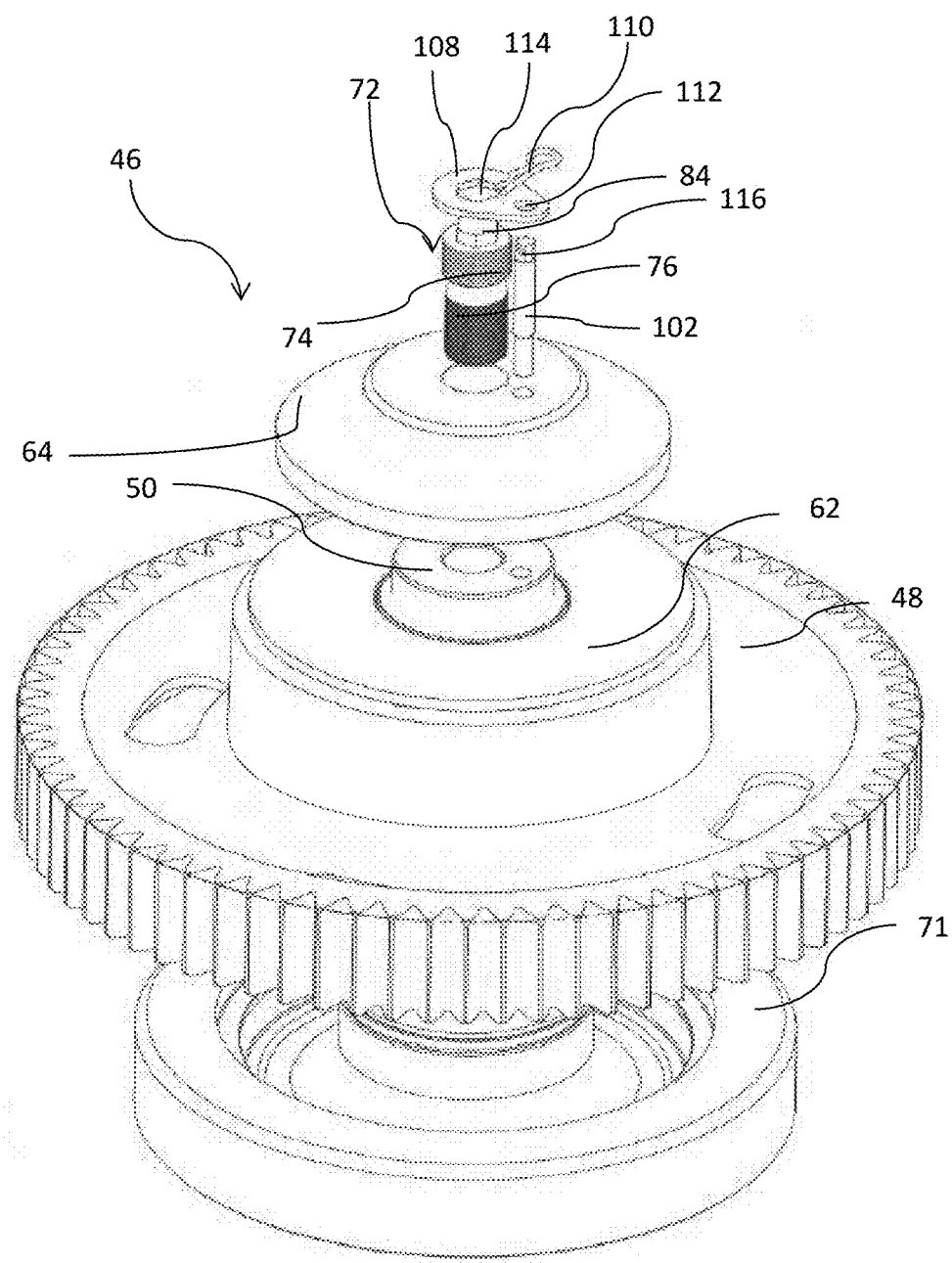
FIG. 4 shows a perspective exploded view of the drive connection of FIGS. 2 and 3.

The connecting bolt 72 has a maximum diameter in the region of the first external thread 74 so that the first external thread 74 is configured as a thread which, proceeding from one end 82 of the connecting bolt 72 positioned externally on the shaft end region 60, extends with an open front face 83 in the direction of the centre of the connecting bolt 72 (see FIGS. 3 and 4). A tool attachment 84 is formed on the external open end 82 on the front face, the connecting bolt 72 being able to be rotated thereby with a corresponding tool. The tool attachment 84 in this case is configured in the form of an external hexagon. Other configurations, such as for example, an internal hexagon or the like, are also conceivable. As mentioned above, the first external thread 74 is in engagement with a corresponding first threaded bore 78 configured in the pressure plate 64. Proceeding from one end 86 of the first external thread 74 positioned inside the first threaded bore 78 a shaft projection 88 adjoins the first external thread 74. The second external thread 76 adjoins the shaft projection 88 and extends into the interior of the shaft end region 60 and/or into the threaded bore 80. The connecting bolt 72 has in the region of the second external thread 78 a smaller diameter than in the region of the first external thread 74. Accordingly, the first and second threaded bores 78, 80 are provided with different diameters.

Figure 2:
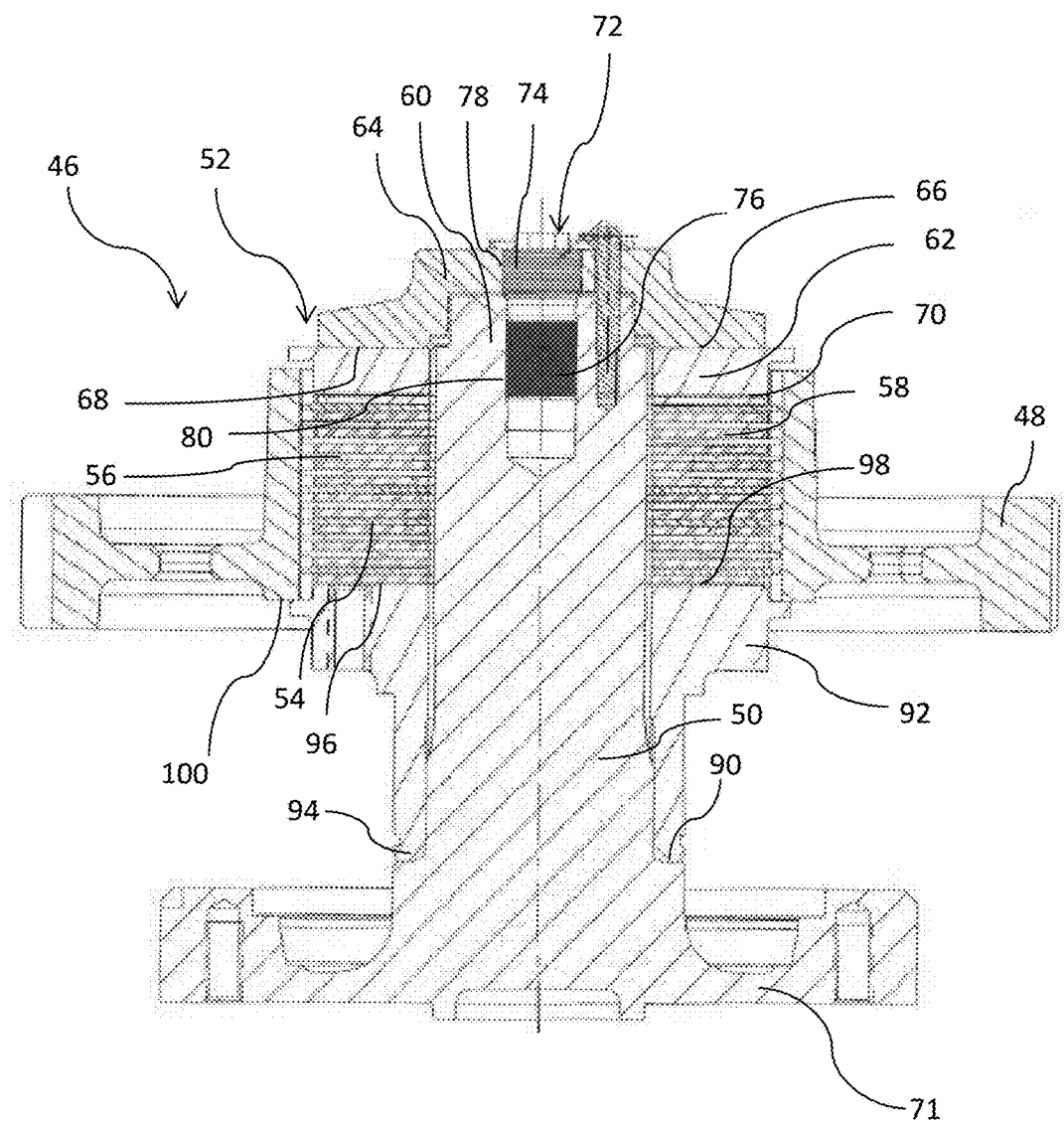
FIG. 2 shows a schematic cross-sectional view of a drive connection for the chopping device of FIG. 1.

In addition to the aforementioned different diameters on the external threads 74, 76, the first external thread 74 and the first threaded bore 78 have a different thread pitch from the second external thread 76 and/or the second threaded bore 80, wherein the second external thread 76 and/or the second threaded bore 80 in this case have a smaller thread pitch. Via the (different) thread pitches, it is possible to influence the extent to which the pressure plate 64 and the drive shaft 50 are moved away from one another and/or toward one another when introducing a rotational movement of the connecting bolt 72. Moreover, the different thread diameters permit a functional and maintenance-friendly assembly of the clutch arrangement 52. The ratios of the thread pitches and thread diameters shown in FIGS. 2 to 4 are adapted to the application and in this context have proved to be a possible arrangement. Other, different ratios are therefore also possible.

In the region of the clutch arrangement 52 a shaft projection or shoulder 90 is formed on the drive shaft 50 (FIG. 2), wherein a spacer sleeve 92 is mounted on the shaft end region 60 of the drive shaft 50 and at a first end 94 comes to bear axially against the shaft projection 90. An end 96 of the spacer sleeve 92 opposing the first end 94 serves as a support for an end 98 of the clutch disk unit 54 opposing the clutch ring 62, and for a circular surface 100 configured on the drive wheel 48, so that the clutch disk unit 54 and the drive wheel 48 are axially supported on the spacer sleeve 92, wherein the clutch disk unit 54 is arranged between the spacer sleeve 92 and the pressure plate 64. The spacer sleeve 92 thus represents a means for producing a supporting force and/or counter-force which is required when axial force is applied by the connecting bolt 72 and at the same time also provides a projection, the drive wheel axially coming to bear thereagainst and being axially secured thereby on the drive shaft 50 with clearance.

In order to secure the pressure plate 64 and the connecting bolt 72 against rotation relative to the drive shaft 50 a threaded pin 102 is arranged, with the threaded pin being able to be brought into engagement with a through-bore 104 configured in the pressure plate 64 and with a threaded bore 106 configured in the shaft end region 60. The threaded pin 102 in this case is guided through the through-bore 104 and screwed into the threaded bore 106. As a result, the connecting bolt 72 which is in engagement with the pressure plate 64 and the drive shaft 50, by the rotation of the pressure plate 64 relative to the drive shaft 50, is prevented from rotating therewith.

Moreover, a connecting plate 108 and a securing pin 110 are provided, for example a spring cotter pin, wherein the connecting plate 108 has a round hole 112 and a hexagonal hole 114 and as a result connects the hexagonal tool attachment 84 of the connecting bolt 72 to the round threaded pin 102, so that a rotation of the connecting bolt 72 relative to the threaded pin 102 is blocked. The securing pin 110 extends transversely to the threaded pin 102 through a transverse bore 116 on the threaded pin 102 and fixes and/or secures the connecting plate 108 to the threaded pin 102.

A drive connection 46 for a chopping device 36 according to the above embodiments is suitable, in particular, for use in a harvesting machine 10, for example a forage harvester or a sugar cane harvester, wherein said forage harvester or sugar cane harvester is generally provided with a chopping device 36 comprising two chopping drums 32, 34 and one of the drums 32, 34 is released from the drive connection 46 and/or from the drive train for adjusting the chopping rate and the chopping output relative to the other drum 32, 34 and may be correspondingly adjusted. Forage harvesters are generally provided with a chopping device 36 comprising just one rotating chopping drum 32, 34 which, however, may also comprise a drive connection 46 according to the above embodiment. Also other harvesting machines, in which a chopping device 36 is provided, may be provided with such a drive connection 46 and are thus taken into consideration.

While the above describes example embodiments of the present disclosure, these descriptions should not be viewed in a limiting sense. Rather, there are several variations and modifications which may be made without departing from the scope of the present invention as defined in the appended claims.

What is claimed is:

1. A drive connection for a chopping drum comprising:
   a drive wheel having a cylindrical central opening;
   a drive shaft located within and having a cylindrical surface disposed concentric with, and in radially spaced relationship to, the cylindrical central opening of the drive wheel, with the shaft having an end region provided with an axially extending threaded bore; and
   a clutch arrangement operable for selectively coupling the drive wheel to the drive shaft, wherein the clutch arrangement comprises a clutch disk unit disposed about the drive shaft and being located within the cylindrical central opening in the drive wheel, said disk unit including a first plurality of clutch disks coupled for rotation with the drive wheel and a second plurality of clutch disks interleaved with said first plurality of disks and coupled for rotation with the drive shaft, with the disk unit being selectively acted upon by an axial force;
   a pressure plate arranged on the shaft end region of the drive shaft for reciprocable movement for selectively pressing axially on the clutch disk unit, with the pressure plate being provided with a threaded bore disposed in axial alignment with the bore in the drive shaft; and
   a connecting bolt arranged concentrically to the drive shaft, wherein the connecting bolt includes a first external thread which is able to be brought into engagement with a first threaded bore configured in the pressure plate and comprises a second external thread which is able to be brought into engagement with a second threaded bore configured in the shaft end region, wherein the first and second external threads and the first and second threaded bores have thread directions which are configured so as to oppose one another.

2. The drive connection according to claim 1, characterized in that the connecting bolt has a maximum diameter in the region of the first external thread.

3. The drive connection according to claim 1, characterized in that the pressure plate covers the shaft end region and has a circular surface facing the clutch arrangement.

4. The drive connection according to claim 3, characterized in that the clutch arrangement comprises a clutch ring which is mounted in an axially displaceable manner on the shaft end region between the pressure plate and the clutch disk unit and which has a circular surface which is oriented toward the circular surface of the pressure plate and which is able to be brought into engagement with the circular surface of the pressure plate facing the clutch arrangement.

5. The drive connection according to claim 1, characterized in that the first external thread and the first threaded bore have thread pitches which are different from the second external thread and the second threaded bore, and with the first external thread and first threaded bore having thread diameters that are different than the thread diameters of the second external thread and the second threaded bore.

6. The drive connection according to claim 1, characterized in that the first external thread and the first threaded bore have a larger thread pitch relative to a thread pitch of the second external thread and the second threaded bore.

7. The drive connection according to one of claim 1, characterized in that the first external thread and the first threaded bore have larger thread diameters that the thread diameters of the second external thread and the second threaded bore.

8. The drive connection according to claim 1, characterized in that a spacer sleeve is mounted on the drive shaft between an annular shoulder of the drive shaft and the clutch disk unit, wherein the drive wheel is configured for being axially supported on the spacer sleeve, and wherein the clutch disk unit is arranged between the spacer sleeve and the pressure plate.

9. The drive connection according to claim 1, characterized in that the pressure plate is provided with a through-bore located in axial alignment with a threaded bore provided in the shaft end region, and a threaded pin being received in the through-bore of the pressure plate and threaded into the threaded bore provided in the shaft end region, in order to prevent the pressure plate from rotating relative to the drive shaft.

10. The drive connection according to claim 9, wherein a tool attachment is provided at an exposed end of the connecting bolt, and a connecting plate connecting the tool attachment to the threaded pin, and a securing pin being provided to prevent removal of the connecting plate from the securing pin, so that a rotation of the connecting bolt relative to the threaded pin is blocked and wherein the securing pin extends transversely to the threaded pin, through said threaded pin, and axially secures the connecting plate axially relative to the threaded pin and/or the pressure plate.

11. A harvesting machine comprising a chopping device having at least one driven chopping drum characterized by a drive connection according to one of claims 1 to 10.

* * * * *